(No Model.)
H. FARMER.
PAWL AND RATCHET MECHANISM.
No. 423,232. Patented Mar. 11, 1890.
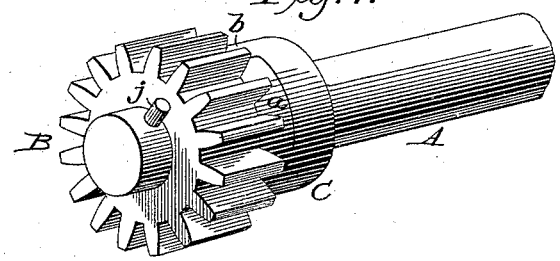
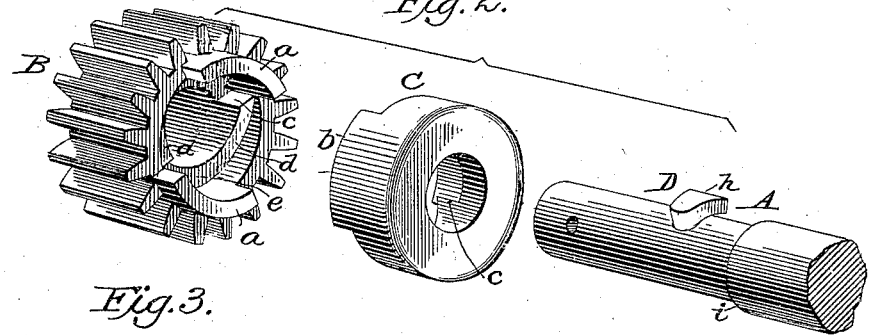
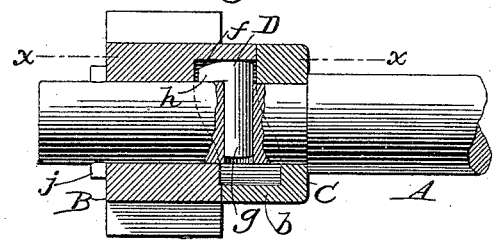
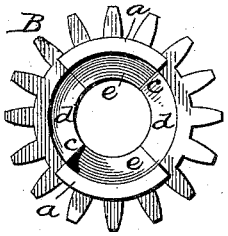
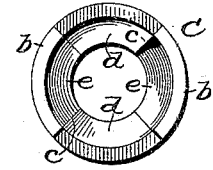
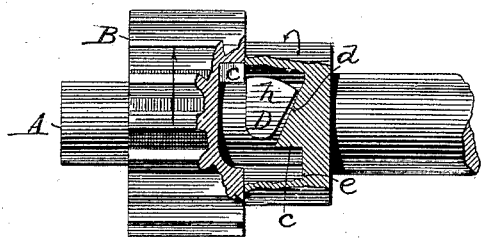
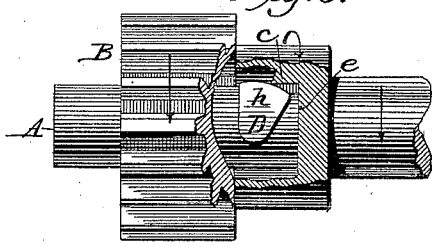
Witnesses.
James F. Duhamel
Horace A. Dodge
Inventor:
Henry Farmer,
by Dodge Sons,
Attys.
N. PETERS, Photo-Lithographer, Washington, D. C.

UNITED STATES PATENT OFFICE.

HENRY FARMER, OF RICHMOND, INDIANA, ASSIGNOR OF ONE-HALF TO FINLEY NEWLIN, OF SAME PLACE.

PAWL-AND-RATCHET MECHANISM.

SPECIFICATION forming part of Letters Patent No. 423,232, dated March 11, 1890.

Application filed December 26, 1889. Serial No. 334,986. (No model.)

*To all whom it may concern:*

Be it known that I, HENRY FARMER, a citizen of the United States, residing at Richmond, in the county of Wayne and State of Indiana, have invented certain new and useful Improvements in Pawl-and-Ratchet Mechanism, of which the following is a specification.

My invention relates to clutches, and has reference more particularly to that class of devices designed for use upon lawn-mowers, though applicable to other machines.

In the drawings, Figure 1 is a perspective view of a gear-wheel and shaft, showing my invention applied thereto; Fig. 2, a perspective view of the parts separated; Fig. 3, a longitudinal sectional view; Figs. 4 and 5, sectional views on the line $x\ x$, Fig. 3, showing the parts in different positions; Fig. 6, a face or end view of the pinion, and Fig. 7 a similar view of the hub of the pinion.

A indicates a shaft; B, a pinion mounted loosely thereon, and C the hub of the pinion, also mounted loosely upon the shaft, but made separate from the main body of the pinion. Pinion B has two or more laterally-projecting arms or flanges $a\ a$, while the hub C has similar arms or flanges $b\ b$, which are adapted to engage or interlock with those of the pinion. The pinion and the hub are both recessed on their opposing faces, so as to form in each one or more abrupt shoulders $c$, one or more inclined faces $d$, and one or more plain faces $e$, as shown in Figs. 2, 4, 5, 6, and 7, the faces $d\ e$ of the pinion and its hub forming, in effect, a way or channel $f$, as shown by dotted lines in Fig. 3, with the abrupt faces or shoulders $c$ of one at right angles to those of the other.

D indicates a pawl or dog having a stem $g$ passing through the shaft and a head $h$ to work within the way or channel $f$, the head $h$ being acted upon alternately by the inclined faces of the pinion and its hub.

When the pinion and its hub turn upon the shaft in the direction represented by the arrows in Fig. 4, the head of the pawl or dog will be thrown alternately to one side and the other by the inclined faces of the hub and pinion, the shaft remaining stationary during the rotation of the pinion and hub. When, however, the direction of rotation is reversed, as indicated by the arrows in Fig. 5, one of the abrupt faces or shoulders of the hub or the pinion will come into contact with the end of the head $h$ of the pawl and lock the said pinion and hub to the shaft and cause the parts to rotate or turn together. The laterally-projecting arms or flanges $a\ b$ completely inclose and protect the pawl from dirt, &c. The number of the arms $a\ b$ and faces or shoulders $c\ d$ may obviously be varied considerably without departing from my invention.

Shaft A is provided with a shoulder $i$, by means of which and a pin $j$ passing through the shaft the pinion and hub are held in proper position.

The device herein shown and described is simple and effective in operation, besides being cheap in construction.

Having thus described my invention, what I claim is—

1. In combination with a shaft, a pawl provided with a stem $g$ to pass through the shaft, and with a lateral head $h$ and a pinion B, having a detachable hub C, said pinion and hub being mounted loosely upon the shaft and provided with a channel $f$ of substantially the form shown to receive the head of the pawl.

2. In combination with shaft A, a pawl D, and a pinion B, provided with a detachable hub C, said pinion and hub being mounted loosely upon the shaft and provided with a shoulder to engage the pawl only when moving in one direction.

3. In combination with shaft A and pawl D, carried thereby, pinion B, recessed on one face, as shown, and provided with a lateral flange $a$, and hub C, also recessed on one face and provided with a flange to engage the flange of the pinion.

4. In combination with a pinion and its hub, provided with a channel $f$, having an inclined face $d$ and a shoulder $c$, a shaft and a pawl having a cylindrical stem $g$ and also a head $h$ to work in the channel.

5. In combination with a shaft A, provided with a shoulder $i$, a pawl D, a pinion B, and detachable hub C, a way or channel formed in the hub and pinion to receive the pawl, and a pin $j$, applied to the shaft.

In witness whereof I hereunto set my hand in the presence of two witnesses.

HENRY FARMER.

Witnesses:
A. L. McMEANS,
WM. P. COOK.